Sept. 17, 1968   E. R. MILLER   3,401,709
CENTRIFUGAL FORCE OPERATED HYDRAULIC GOVERNORS
Filed May 27, 1966   2 Sheets-Sheet 1
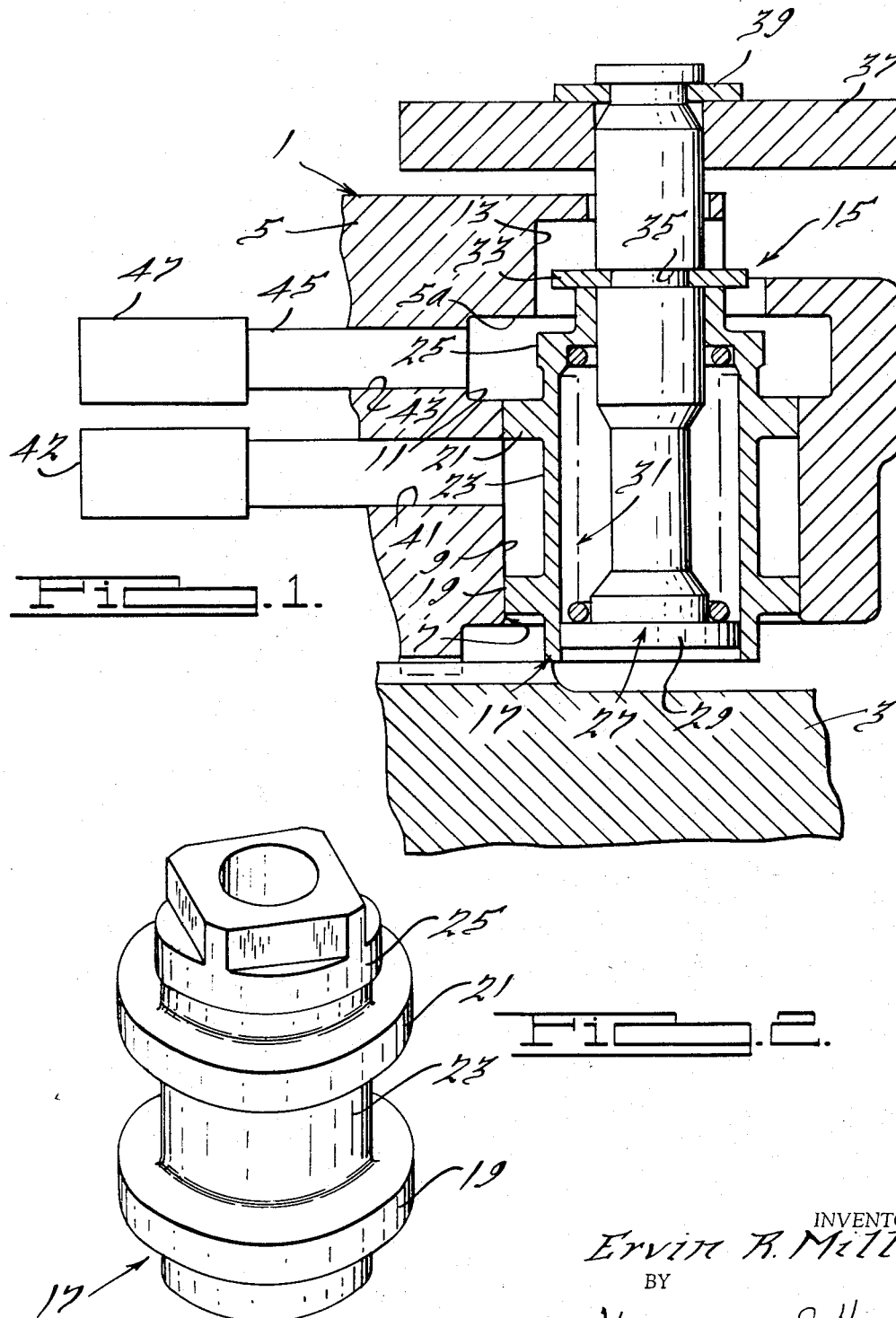
INVENTOR.
Ervin R. Miller
BY
Harness and Harris
ATTORNEYS.

INVENTOR.
Ervin R. Miller
BY
Harness and Harris
ATTORNEYS.

United States Patent Office 3,401,709
Patented Sept. 17, 1968

3,401,709
CENTRIFUGAL FORCE OPERATED HYDRAULIC GOVERNORS
Ervin R. Miller, Detroit, Mich., assignor to Chrysler Corporation, Highland Park, Mich., a corporation of Delaware
Filed May 27, 1966, Ser. No. 553,519
10 Claims. (Cl. 137—56)

This invention relates to centrifugal force operated hydraulic governors, and more particularly to a hydraulic governor which may be mounted on one side of a rotatable member and which is adapted to vent fluid and foreign particles or the like from the outer end thereof.

Hydraulic governors used in automatic transmissions usually include a valve member which is reciprocable radially in a bore for controlling the passage of fluid from a pressure source in the transmission to a lower pressure operated device, such as a valve. These governors normally include a stem or rod extending from the movable valve through a hole extending diametrically through a shaft, such as the transmission output shaft. One or more weights are connected to the other end of the stem or rod on the opposite side of the output shaft. These weights aid in controlling the governor pressure-speed curve characteristics of the governor. Since a hole is made diametrically through the output shaft of the transmission, stress concentrations which are not advantageous may be formed in the shaft. In order to avoid the stress concentrations in the shaft, one-sided governors, i.e., governors adapted to be mounted on one side only of an output shaft, have been developed. However, these governors include vent ports adjacent the shaft at the inner end of the governor and present venting problems since centrifugal force created on the governor tends to throw fluid and any foreign particles therein outwardly away from the vent.

Accordingly, one of the principal objects of the present invention is to provide a hydraulic governor adapted to be mounted on one side of a rotatable member, such as a transmission output shaft, thereby avoiding stress concentrations in the output shaft, and at the same time provide for venting from the governor by centrifugal force.

A further object of the present invention is to provide a hydraulic governor of the class described in which venting foreign particles and fluid from the governor is accomplished by a vent located near the outer end of the governor.

Still another object of the present invention is to provide a hydraulic governor such as described which is simple and economical in construction, yet effective in operation.

Another object of this invention is to provide a hydraulic governor such as described, which in one embodiment, eliminates the necessity of a biasing member, thereby reducing the cost of the governor.

Other objects of the invention will become apparent as the description progresses.

In the accompanying drawings, in which two of various possible embodiments of this invention are illustrated;

FIG. 1 is a vertical section taken through one embodiment of a governor of this invention attached to a rotatable member with certain connecting elements shown schematically;

FIG. 2 is a perspective view of a valve used in the governor illustrated in FIG. 1;

Corresponding reference characters indicate corresponding parts throughout the drawings.

Figure 3:
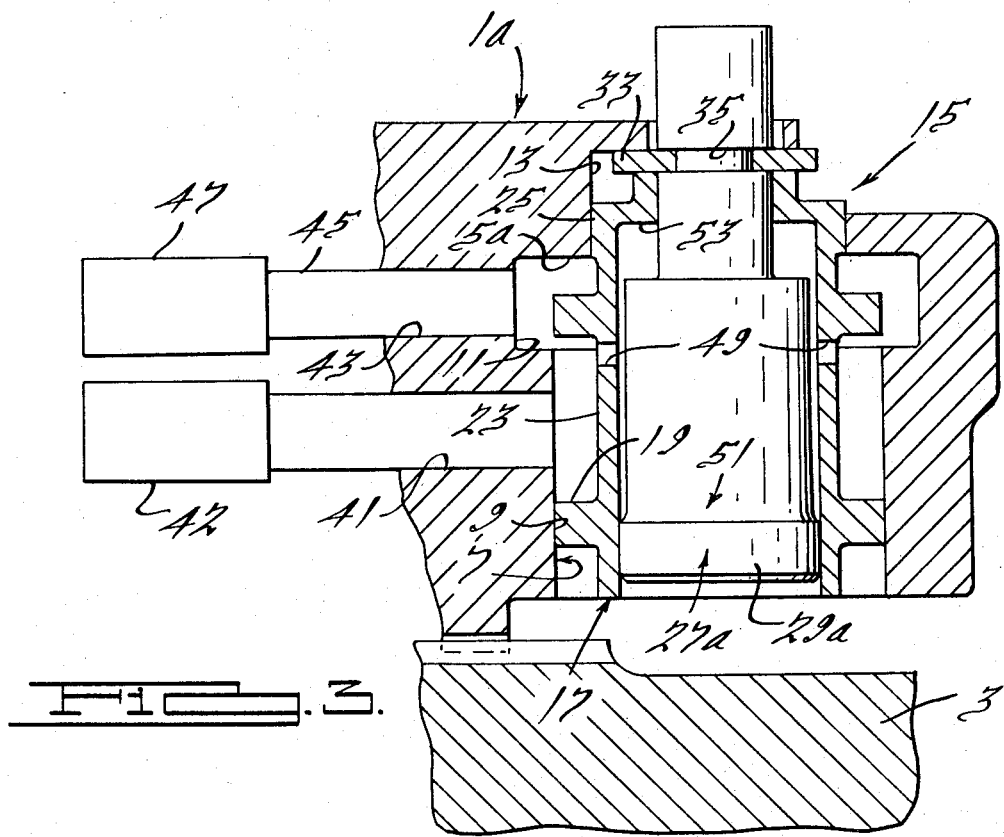
FIG. 3 is a view similar to FIG. 1 illustrating a second embodiment of this invention.

Referring now to the drawings, one embodiment of a hydraulic governor of this invention is generally indicated at 1 in FIG. 1. It is drivingly connected by means (not shown) to one side of a rotatable member 3, such as the output shaft of an automatic transmission. Governor 1 comprises a body 5 having a radially extending bore 7 which is preferably stepped to provide three portions 9, 11, and 13. Portion 9 is located adjacent shaft 3 and may be referred to as the inner portion. Portion 11 is located outwardly of portion 9 and has a larger diameter than portion 9. The portion 13, which may be referred to as the outer portion, is located outwardly of portion 11 and opens into the area outside body 5 at one side thereof as indicated at 15.

A control valve member 17 is reciprocably mounted in bore 7 and has spaced annular lands or shoulders 19 and 21 thereon. Shoulders 19 and 21 are substantially the same diameter and are connected by a narrower vent portion 23. A third annular land or shoulder 25 is provided on valve member 17 and is slidable in the outer bore portion 13.

Valve member 17 is hollow and a weight member 27 extends from inside the valve member 17 to the outside thereof. Weight member 27 is provided with an end head 29 slightly smaller in diameter than inside hollow portion of valve member 17. A spring 31 reacts between the outer end of valve member 17 and the end head 29 to bias the weight member 27 inwardly relative to valve member 17. The inward movement of weight member 27 relative to valve member 17 is limited by a stop ring 33 located in an annular groove 35 in the weight member. A second outer weight member 37 is slidably mounted on the outer end of weight member 27 and prevented from outward removal therefrom by a snap ring 39. As will be made apparent hereinafter, weights 27 and 39 act in unison to enhance the characteristics of the governor pressure-speed curve of the governor.

Governor body 5 is formed with a pressure fluid inlet 41 adapted to be connected to a source 42 of pressure fluid, such as a pump driven by the input and/or output shafts of a motor vehicle automatic power transmission. The pump 42 is adapted to supply inlet 41 with a system pressure fluid, referred to as "line" pressure fluid. As shown, inlet 41 opens into portion 9 of bore 7.

The pressure fluid outlet 43 is provided in body 5 and opens into portion 11 of bore 7. Outlet 43 is adapted to receive pressure fluid from inlet 41 when valve member 17 is moved outwardly from its FIGURE 1 position to a position wherein shoulder 21 is completely moved from within portion 9 of bore 7, thereby cracking open the valve.

The pressure of fluid passing through outlet 43 is herein denoted "governor" pressure and such pressure is transmitted through fluid in a conduit 45 to a pressure fluid operated device 47, such as a transmission shift valve, that is to be responsive to the rotational speed of shaft 3. As indicated previously, body 5 is relieved at the upper end thereof to provide an opening or vent 15 for discharging fluid and foreign particles from bore 7 when valve member 17 is moved inwardly from its outer position to a position such as shown in FIGURE 1, i.e., to a position wherein communication between inlet 41 and outlet 43 is blocked by shoulder 21 and communication is established from bore portion 11 to portion 13 and outlet or vent 15.

The manner in which the aforedescribed device functions as a hydraulic governor is as follows:

When the shaft 3 is at rest the valve member 17 is located in the position shown in FIGURE 1. In such position shoulder 21 blocks communication between inlet 41 and outlet 43, while outlet or vent 15 is in communication with portion 11. As the shaft 3 begins to rotate and its speed increases, centrifugal force acts on a valve member 17, spring 31, and the combined weights 27 and 37, to move all these elements outwardly as a unit. The spring 31 functions to maintain the weights and the valve member 17 together as a unit during the initial portion of the outward movement. When shoulder 21 moves out of portion 9 into portion 11 of bore 7, the valve becomes cracked open, i.e., communication is established between inlet 41 and outlet 43. At this time, "line" pressure fluid from inlet 41 passes into outlet 43. The vent 15 is closed by annular shoulder 25 on valve member 17. The pressure fluid in bore portion 11 between the outer side of land or shoulder 21 and a body portion 5a reacts against portion 5a on shoulder 21 and tends to urge the valve member radially inward to block communication between inlet 41 and outlet 43. At the same time that the pressure fluid in bore 7 acting on shoulder 21 of valve member 17 is tending to move the complete valve unit comprising members 17, 31, 27, and 37, inwardly, there is a simultaneously applied centrifugal force acting on the valve unit which tends to open the valve, i.e., place inlet 41 in communication with outlet 43. The centrifugal force acting on the valve unit is proportional to the square of the speed of shaft 3. It will thus be seen that radial movement of the valve element 17 is the resultant of two simultaneously acting, opposed, radially directed forces which cause the valve 17 to function as a pressure regulating valve. The valve 17, along with spring 31, and weights 27 and 37, moves radially until an equilibrium is established between the forces acting thereon for each speed of the shaft 3. When the several applied forces are in equilibrium and the valve member 17 is in a position wherein shoulder 21 is just blocking the communication between inlet 41 and outlet 43. At the time the valve member 17 is in equilibrium, pressure of the fluid in the bore portion 11, which produces a force substantially equal to the centrifugal force on the valve member is proportional to the speed of shaft 3. This speed-responsive pressurized fluid in portion 11 and outlet 43 is used to actuate speed responsive device 47.

If the speed of shaft 3 should increase after the valve member 17 attains equilibrium the valve member will be temporarily moved outwardly to establish communication between inlet 41 and outlet 43. On admittance of additional pressure fluid to bore portion 11, due to the outward movement of the valve member 17, an increased pressure fluid generated force will be applied to the shoulder 21 of the valve member and the latter will be urged radially inwardly until a condition of equilibrium is established for the increased shaft speed. It will be seen that the radially reciprocating valve 17 functions as a pressure regulating or pressure reducing valve to convert the system or "line" pressure in inlet 41 to a speed responsive "governor" pressure, in portion 11 and outlet 43, which is proportional to the speed of shaft 3.

When the shaft 3 reaches a predetermined speed, the weights 27 and 37 will bottom out and result in different governor pressure-speed curve characteristics as described more fully hereafter. If the speed of shaft 3 should be decreased, the centrifugal force that has been urging the valve member, spring and weights outwardly in opposition to the radially inwardly directed force applied to the shoulder 21 by the "governor" pressure in bore portion 11, would be reduced and valve member 17 would move inwardly from an equilibrium position. As a result of the valve member moving inwardly, the vent 15 is uncovered by the shoulder or land 25. This reduces the pressure of fluid trapped in portion 11 until another condition of equilibrium is established between outwardly directed centrifugal force acting on the valve member and inwardly directed force acting on the shoulder 21 by the fluid pressure in bore portion 11. From the foregoing explanation it is obvious that the pressure fluid trapped in bore portion 11 is truly a fluid in which the pressure is proportional to the speed of the shaft 3, i.e., it is a speed shaft responsive pressure fluid.

If the speed of shaft 3 should exceed a predetermined value, then the complete valve unit would be in a position wherein ring 33 was seated against the outer portion of body 5. Thus, the mass of the weights 27 and 33 would no longer be considered in a determination of the centrifugal force on the valve unit.

Figure 4:
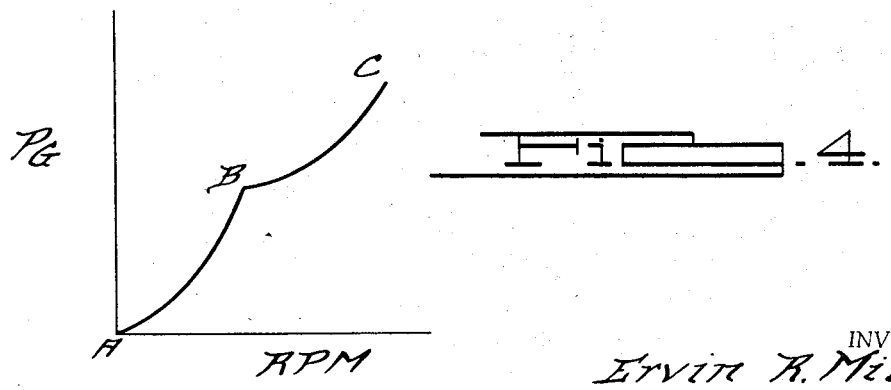
FIG. 4 is a governor pressure-speed curve for the governor shown in FIGURES 1 and 3.

Up until the time the ring 33 seats on the body 5, the valve member 17, spring 31, weights 27 and 37 function as a single weight. As a single weight, they cause the governor pressure-speed curve to be parabolic as indicated by the curve A–B in FIG. 4. In such figure, the vertical axis represents governor pressure (PG) and the horizontal axis represents speed (r.p.m.). After the weights 27 and 37 are bottomed out, i.e., after ring 33 is seated on body 5, the mass thereof is no longer applied in determining the centrifugal force. Accordingly, the second stage of the governor pressure speed curve, shown by curved portion B–C, is less inclined than the first stage curve A–B where the mass acting on the valve member was greater.

The advantage of the curve ABC is that the slope of the two-step curve has been reduced considerably so that it now extends over a much greater speed range. Consequently, the upshifts and downshifts of an automatic transmission may be effected over a much greater range. In addition, the flexibility of a transmission has been improved by increasing the speed range during which changes in speed ratio drive may occur.

A second embodiment of this invention is illustrated at 1a in FIG. 3, and is generally similar to the embodiment shown in FIG. 1. The governor pressure-speed curve of governor 1a and the venting system for venting fluid and foreign particles therefrom is the same as in governor 1. The main difference between the two governors is the method in which the weight 27a is biased inwardly relative to valve member 17. The valve member 17 is provided with a plurality of ports 49 in the wall of the central portion 23 to allow "line" pressure fluid to flow into the valve member. Weight 27a is provided with an enlarged weight portion 51, extending outwardly from end head 29a, which may be utilized to replace the weight 37 in the FIG. 1 embodiment. The diameters of the outer portion of weight 27a and end head 29a are such that the "line" pressure fluid flowing into valve 17 is adapted to react on an interior valve portion 53 against enlarged portion 51 and end head 29a with approximately the same force as spring 31 in governor 1. Thus, the use of "line" pressure fluid, as described, obviates the necessity of spring 31 and thereby reduces the cost of the governor.

It will be seen that in both embodiments the provision of a vent at the outer end of the bore 7 permits fluid and foreign particles in the fluid to be vented by centrifugal force. This is advantageous in that it prevents gumming or sticking of the valve member 17 in bore 7 due to foreign particles. Moreover, this self-cleaning aspect of the governor would require very little, if any, maintenance.

It will also be noted that by placing the governor completely on one side of shaft, the need for boring a hole through the shaft is completely eliminated, thereby obviating the possibility of stress concentrations in the shaft 3.

The particulars of the foregoing description are provided merely for purposes of illustration and are subject to considerable latitude of modification without departing from the novel teachings disclosed herein. Accordingly, the scope of the invention is intended to be limited only as defined in the appended claims and equivalents thereof.

What is claimed is:

1. A governor comprising a body adapted to be mounted on one side of a rotatable member and connected to a source of pressure fluid comprising a body having a radially extending bore therein, said body having a pressure fluid inlet into said bore and a pressure fluid outlet from said bore, said outlet being located outwardly of said inlet, said body having a vent located outwardly of said outlet, a valve member movable radially in said bore, said valve member being adapted to place said inlet in communication with said outlet in one position and to place said outlet in communication with said vent in another position, said valve member being hollow, a weight extending radially from inside said valve member to the outside thereof, and a spring surrounding said weight inside said valve member and biasing the weight inwardly relative to said valve member.

2. A governor as set forth in claim 1 wherein said valve member has first and second lands spaced apart from one another for controlling the flow of pressure fluid through the governor, said lands being of substantially the same diameter.

3. A governor as set forth in claim 2 wherein said bore is formed with a reaction area outwardly of the outer land, the pressure fluid in said bore applying an inwardly directed force on said outer land.

4. A governor comprising a body adapted to be mounted on one side of a rotatable member and connected to a source of pressure fluid, said body having a radially extending bore therein, a first portion of said bore having a first diameter, a second portion of said bore, located outwardly of said first portion, and a third portion of said bore having a diameter smaller than said first portion, a fluid pressure inlet into the first portion of said bore, a fluid pressure outlet from the second portion of said bore, and a vent from the third portion of said bore, a valve member mounted for radial movement in said bore, said valve member having inner and outer lands spaced apart from one another, said lands having substantially the same diameter, said valve being movable in said bore in such manner that the inner land moves only in said first portion, and said outer land moves in said first and second portions, said inlet being placed in communication with said outlet for delivering pressure fluid to said outlet and said vent being closed when said outer land is in said second portion, said outlet being placed in communication with said vent for discharging fluid from said bore when said outer land is in said first portion.

5. A governor as set forth in claim 4 wherein said valve member is hollow, a weight extending from inside said valve member to the outside thereof in a radial direction, said weight being adapted for radial movement relative to said valve member, and a spring biasing said valve member outwardly relative to said weight.

6. A governor as set forth in claim 5 further including another weight mounted on the outer end of the first-mentioned weight.

7. A governor comprising a body adapted to be mounted on one side of a rotatable member, said body having a radially extending bore therein, an inlet into said bore adapted to be connected to a source of pressure fluid, an outlet from said bore adapted to be connected to a fluid pressure operated device, said outlet being located outwardly of said inlet, a vent from said bore, said vent being located outwardly of said outlet, a valve member in said bore movable radially therein and adapted to be moved outwardly by centrifugal force, weight means connected to said valve for aiding the outward movement of said valve, said valve placing said inlet and outlet in communication as it moves outwardly and placing said outlet in communication with said vent as it moves radially inwardly.

8. A governor as set forth in claim 7 wherein said valve member has inner and outer shoulders of substantially the same diameter, said shoulders being spaced apart in a radial direction.

9. A governor as set forth in claim 8 wherein said weight means includes a first weight extending radially out from said valve member, a spring biasing said valve outwardly relative to said first weight, and a second weight mounted on the outer end of said first weight.

10. A governor as set forth in claim 8 wherein said valve member is hollow, said weight means comprising a weight member extending radially out from said valve member and substantially closing the inner end thereof, said valve member having at least one opening in the wall thereof to permit the ingress of pressure fluid from said source into the interior of said valve member for biasing the valve member and weight member apart.

References Cited
UNITED STATES PATENTS

| | | | |
|---|---|---|---|
| 2,378,158 | 6/1945 | Roche | 137—56 |
| 2,697,363 | 12/1954 | Sheppard | 137—56 X |
| 2,738,650 | 3/1956 | McAfee | 137—56 X |
| 2,876,784 | 3/1959 | Adams | 137—56 |
| 2,941,539 | 6/1960 | Hewko | 137—56 |
| 3,049,028 | 8/1962 | English | 137—56 X |
| 3,212,514 | 10/1965 | Kelley | 137—56 |

CLARENCE R. GORDON, *Primary Examiner.*